W. C. Bamberger,
Axle Gage.
N° 26,079.    Patented Nov. 15, 1859.
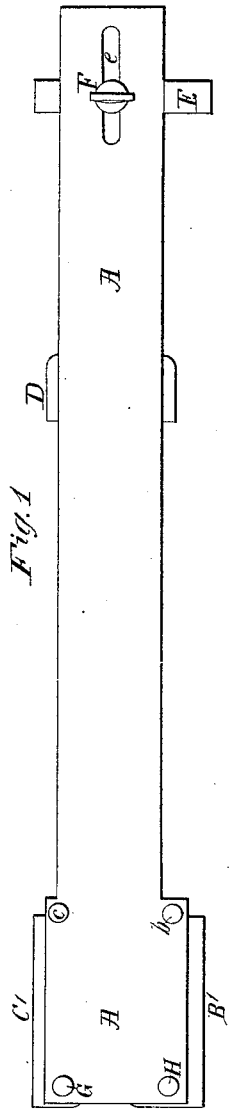
Fig. 1
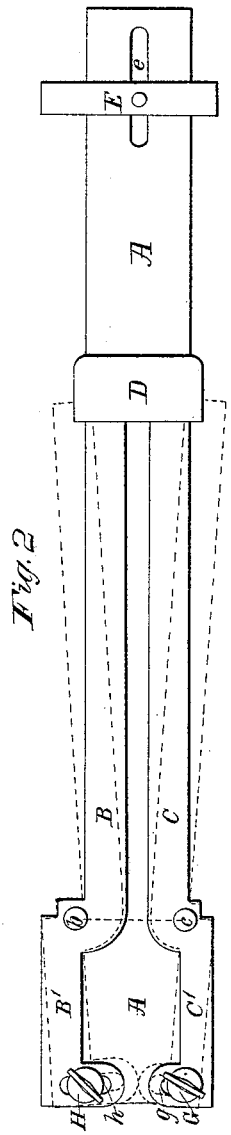
Fig. 2
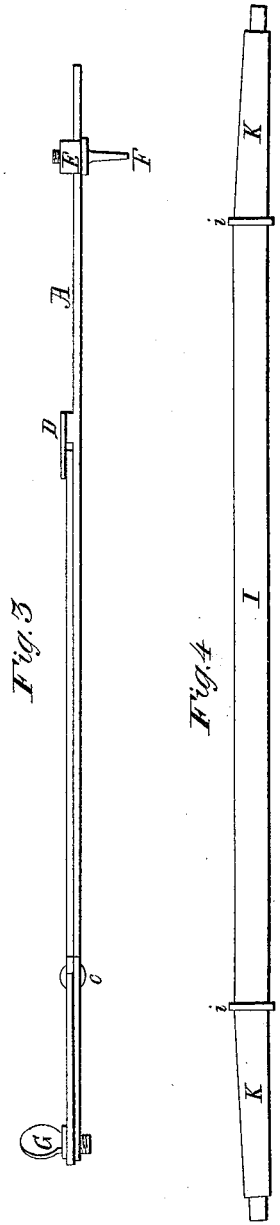
Fig. 3
Fig. 4 ns is called by carriage makers the bottom
UNITED STATES PATENT OFFICE.

WILLIAM C. BAMBERGER, OF WASHINGTON, DISTRICT OF COLUMBIA.

GAGE FOR IRON AXLES.

Specification of Letters Patent No. 26,079, dated November 15, 1859.

*To all whom it may concern:*

Be it known that I, WILLIAM C. BAMBERGER, of the city of Washington and District of Columbia, have invented a new and useful Gage for Axles, to be used in giving the required "set" and "gather" to wheels of any given "dish" with a facility and precision hitherto unattained; and I do hereby declare the following to be a correct description of the same, reference being had to the accompanying drawings, in which—

Figure 1 is a rear elevation of the instrument. Fig. 2 is a front view and Fig. 3 an edge view of the same. Fig. 4 is an axletree to which the downward "set" has been given.

To make the nature and uses of this instrument perfectly clear a few preliminary observations may be necessary. In the manufacture of wheels for vehicles, the spokes are usually inserted into the nave or hub at a greater or less angle, which gives to the wheel the form commonly called "dished." The amount of "dish" varies with the character of the vehicle and often differs in the wheels of the same vehicle. If "dished" wheels were placed upon perfectly horizontal journals, the lower spokes would vary from a vertical line as much as the upper ones, and the wheels would have a spread at bottom dangerous to the safety of the vehicle. It is therefore necessary to give to the arms or journals of the axletree such a downward inclination from the line of the axletree as will compensate for the dish of the wheel and bring the center of the lowermost spoke into a vertical line, or rather one at right angles to the line of the axletree. This inclination of the journals is called by carriage makers the bottom "set" of the axles, and it is found very desirable to have at command a ready means of indicating with precision what it is to be in any given case, and thus providing the workman with a sure and convenient guide in producing it. It is a part of the object of my invention to afford a convenient instrument for that purpose. Again, if the wheels of a vehicle were placed upon journals at right angles to the line of draft, the wheels would, when the vehicle is drawn forward, have a tendency to spread apart at their forward rims. To counteract this tendency it is necessary to give an inward and forward inclination to the arms or journals so as to bring the center line of the forward spoke just inside of a line parallel to the line of traction. This forward inclination is known to coach makers as the "gather" of the wheels, and the necessity for a gage to measure it is the same as in the case of the downward "set." It should be observed that this gage is only intended to be applied to iron axletrees, to which the "set" and "gather" have to be imparted while in a heated state. By the method hitherto employed, the heated arm of the axletree was inserted into the box of the wheel—a very objectionable operation. By the use of my gage the necessity for it is entirely obviated.

To enable others to make and use my improved axle gage, I will proceed to describe its construction and the method of applying it in practice, referring to the accompanying drawings in which the same letter is used to mark the same part wherever it occurs.

The instrument consists mainly of two levers pivoted to the body of a gage. In the drawings A marks the body of the gage; B the long arm of the "set" lever; B' the short arm of the same; b the pivot of said lever; C the long arm of the "gather" lever; C' its short arm, and c its pivot; D the guide in which the extremities of the long arms of both levers work; E adjustable dog or stop; e its slot, and F its clamp or set screw.

G is the set screw for clamping lever C, and g the slot in which it works; H the set screw, and h the slot for clamping lever B.

I is the body of the axletree; i the shoulders, and K the arms of the same.

The dog E is made to project on either side of the body of the gage so far as that its ends shall be in line with the edges of the short arms B' and C' of the levers respectively, when those levers are parallel with the body of the gage. It is adjustable longitudinally to suit the varying lengths of axletrees.

Before using this instrument, it is necessary to know the taper and length of the journal, the dish of the wheel, its diameter, and the amount of gather it is intended to impart.

The taper of the journal is ascertained by measurement with calipers. To obtain the "dish," place a straight edge across the front of the wheel; measure from the straight edge to the center of the spoke at the hub; then measure from the straight edge to the center of the tire. The latter distance subtracted from the former will give the exact dish of the wheel. The amount of "gather" is arbitrary, depending on the judgment and experience of the coachmaker, and the character of the vehicle. It is usually greater in light vehicles. It may be found convenient to have both arms of the levers graduated in the same way as an ordinary rule, the graduation to begin at the dotted line between b and c Fig. 2. Otherwise a common rule may be employed to lay off any required distance on the arms.

The required elements having been obtained, in order to fix the gage to the bottom "set" of the axle, proceed as follows:—Lay off upon arm B a distance equal to twice the length of the arm or journal, K, of the axletree, beginning to measure from the line b, c, Fig. 2. Then move the arm B inward, at the point just ascertained, a distance equal to the whole taper of the journal and clamp it there. Now measure off upon arm B, beginning as before at line b c, a distance equal to half the diameter of the wheel, and at this point move the arm B outward a distance equal to the dish of the wheel, and clamp it. The gage is now fixed to the bottom "set" of the axle, and is ready for use. In use, it is applied to the bottom of the axletree, the end of the dog E being in contact with the axletree, so as to keep the gage parallel with it.

The lever C should be fixed to the "gather" at the same time that the lever B is fixed to the set, as both the "set" and "gather" may be given to the axle at the same time and by the same heating. This is the reason why I use two levers attached to the same gage.

To set the gage for the gather, proceed as follows:—Lay off upon arm C a distance equal to twice the length of the arm or journal. Then move the arm C inward, at the point just ascertained, equal to the whole taper of the journal, and clamp it. Now measure off upon arm C a distance equal to half the diameter of the wheel, and, at this point, move the arm outward a distance equal to half the "gather" previously determined. Clamp it and it is ready for use, being applied in practice to the front of the axletree.

By reversing the second movement of the lever, it is obvious that the gage may be applied to the top of the axle for giving the "set" and to the back of it for giving the "gather" when, for any reason, it may be desirable. In crankaxles it would usually be applied to the top.

Having thus fully described my invention what I claim and desire to secure by Letters Patent is—

An axle gage constructed and operated substantially in the manner described.

The above specification signed and witnessed this twenty-eighth day of September A. D. 1859.

WM. C. BAMBERGER.

Witnesses:
 CHAS. C. ANDERSON,
 CHAS. F. STANSBURY.